US012563655B2

(12) United States Patent
Steiner et al.

(10) Patent No.: US 12,563,655 B2
(45) Date of Patent: Feb. 24, 2026

(54) SENSOR DEVICE HAVING THERMALLY-INSULATED DETECTOR

(71) Applicant: Lutron Technology Company LLC

(72) Inventors: James P. Steiner, Royersford, PA (US); Dinesh Sundara Moorthy, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/426,448

(22) Filed: Jan. 30, 2024

(65) Prior Publication Data

US 2024/0284574 A1 Aug. 22, 2024

Related U.S. Application Data

(60) Provisional application No. 63/482,221, filed on Jan. 30, 2023.

(51) Int. Cl.
| | |
|---|---|
| *H05B 47/13* | (2020.01) |
| *G01J 5/00* | (2022.01) |
| *G01J 5/0806* | (2022.01) |

(52) U.S. Cl.
CPC ............ *H05B 47/13* (2020.01); *G01J 5/0025* (2013.01); *G01J 5/0806* (2013.01)

(58) Field of Classification Search
CPC .... H05B 47/13; H05B 47/115; H05B 47/125; H05B 47/135; G01J 5/0025; G01J 5/0806; G01J 5/0896; G08B 13/193; G08B 29/02
See application file for complete search history.

(56) References Cited

U.S. PATENT DOCUMENTS

| | | | |
|---|---|---|---|
| 7,800,049 B2 * | 9/2010 | Bandringa | G08B 29/22 |
| | | | 250/342 |
| 7,940,167 B2 * | 5/2011 | Steiner | G08B 29/24 |
| | | | 206/703 |
| 8,009,042 B2 | 8/2011 | Steiner et al. | |
| 8,199,010 B2 | 6/2012 | Sloan et al. | |
| 8,228,184 B2 | 7/2012 | Blakeley et al. | |

(Continued)

FOREIGN PATENT DOCUMENTS

| | | |
|---|---|---|
| CA | 3194435 A1 | 4/2022 |
| GB | 2604854 A | 9/2022 |

*Primary Examiner* — Tung X Le
(74) *Attorney, Agent, or Firm* — Philip N. Smith; Glen R. Farbanish; Michael S. Czarnecki

(57) ABSTRACT

A sensor device configured to detect an occupancy condition in a space may comprise a thermally-insulated detector (e.g., a pyroelectric detector). The sensor device may comprise a heat-generating device, such as a light-emitting diode, that may be positioned within the enclosure at a location such that when illuminated, light from the light emitting diode illuminates a lens through the detector receives infrared energy. The printed circuit board may have a ground plane having at least a portion located between the detector and the light-emitting diode. The printed circuit board may comprise a slot extending from a front surface into the printed circuit board. The ground plane may comprise a gap surrounding slot. The slot and/or the gap in the ground plane may be located between the detector and the light-emitting diode to reduce the thermal transfer of heat generated by the light-emitting diode to the detector.

22 Claims, 9 Drawing Sheets

(56)     References Cited

U.S. PATENT DOCUMENTS

| | | | |
|---|---|---|---|
| 9,664,569 B2 | 5/2017 | Mittleman et al. | |
| 10,697,622 B2 * | 6/2020 | Duckworth | F21V 23/008 |
| 2010/0207759 A1 * | 8/2010 | Sloan | H05B 47/19 |
| | | | 174/491 |
| 2011/0139965 A1 * | 6/2011 | Sloan | G01J 1/4204 |
| | | | 250/214 AL |
| 2013/0207528 A1 * | 8/2013 | Carberry | H05B 47/115 |
| | | | 29/854 |
| 2016/0369991 A1 * | 12/2016 | Lim | G02B 19/009 |
| 2019/0154499 A1 * | 5/2019 | Buckley | G01J 1/0437 |
| 2023/0018632 A1 * | 1/2023 | Asthana | G01J 5/0803 |

* cited by examiner

SENSOR DEVICE HAVING THERMALLY-INSULATED DETECTOR

CROSS-REFERENCE TO RELATED APPLICATIONS

This application claims priority to U.S. Provisional Patent Application No. 63/482,221, filed on Jan. 30, 2023, the entire disclosure of which is incorporated by reference herein.

BACKGROUND

Occupancy and vacancy sensors are often used to detect occupancy and/or vacancy conditions in a space in order to control an electrical load, such as, for example, a lighting load. An occupancy sensor typically operates to turn on the lighting load when the occupancy sensor detects the presence of a user in the space (e.g., an occupancy condition) and then to turn off the lighting load when the occupancy sensor detects that the user has left the space (e.g., a vacancy condition). A vacancy sensor typically operates to turn off the lighting load when the vacancy sensor detects a vacancy in the space. Therefore, when using a vacancy sensor, the lighting load must be turned on, such as manually (e.g., in response to a manual actuation of a control actuator).

Occupancy and vacancy sensors have been provided in wall-mounted load control devices that are coupled between an alternating-current (AC) power source and an electrical load for control of the amount of power delivered to the electrical load. Other occupancy and vacancy sensors have been provided as part of lighting control systems. These sensors may be coupled via a wired control link to a lighting controller (e.g., a central processor), which then controls the lighting loads accordingly. Other sensors may be battery-powered and may be operable to transmit wireless signals, such as radio-frequency (RF) signals, to a lighting controller or directly to load control devices, such as dimmer switches. The occupancy and vacancy sensors in lighting control systems may be mounted to the ceiling or high on a wall. Therefore, the occupancy and vacancy sensors may be positioned optimally to detect the presence of the user in all areas of the space. An occupancy and/or vacancy sensor typically comprises an internal detector, such as, for example, a pyroelectric infrared (PIR) detector, and a lens for directing energy to the internal detector for detecting the presence of the user in the space.

SUMMARY

As described herein, a sensor device configured to detect an occupancy condition in a space may comprise a thermally-insulated detector (e.g., a pyroelectric detector). The detector may be part of a passive infrared sensing circuit that allows the sensor device to detect occupancy and/or vacancy conditions in the space in which the sensor device is installed. The sensor device may comprise an enclosure having an aperture in which a lens is received and a printed circuit board housed within the enclosure. The lens may be centered about a first axis that extends in a longitudinal direction. The printed circuit board may comprise a ground plane that covers at least a portion of a front surface of the printed circuit board. The detector may have an opening for receiving infrared energy, and may be mounted to the front surface of the printed circuit board, such that the opening of the detector is substantially centered about the first axis of the lens. The detector may receive infrared energy through the lens and generate an output signal in response to the received infrared energy. The passive infrared sensing circuit may be configured to generate an occupant detection signal based on the output signal generated by the detector. The sensor device may also comprise a control circuit configured to receive the occupant detection signal and to determine the occupancy condition in the space in response to the occupant detection signal.

The sensor device may comprise a heat-generating device, such as a light-emitting diode, that may be positioned within the enclosure at a location such that when illuminated, light from the light emitting diode illuminates the lens. The location of the light-emitting diode may be such that the light-emitting diode is mounted to the front surface of the printed circuit board and spaced apart from the detector along a second axis that extends in a radial direction and passes through the first axis of the lens. At least a portion of the ground plane may be located along the second axis between the detector and the light-emitting diode. The control circuit may be configured to control the light-emitting diode to illuminate the lens. The ground plane may comprise a gap located along the second axis in the portion of the ground plane located between the detector and the light-emitting diode. The gap in the ground plane configured to reduce a thermal transfer of heat generated by the light-emitting diode to the detector.

In addition, the printed circuit board may comprise a slot extending from the front surface into the printed circuit board. The slot may be located between the detector and the light-emitting diode for reducing reduce the thermal transfer of heat generated by the light-emitting diode to the detector. The gap in the ground plane surrounds an opening of the slot at the front surface of the printed circuit board. The slot may extend from the front surface to a rear surface of the printed circuit board.

DETAILED DESCRIPTION

Figure 1:
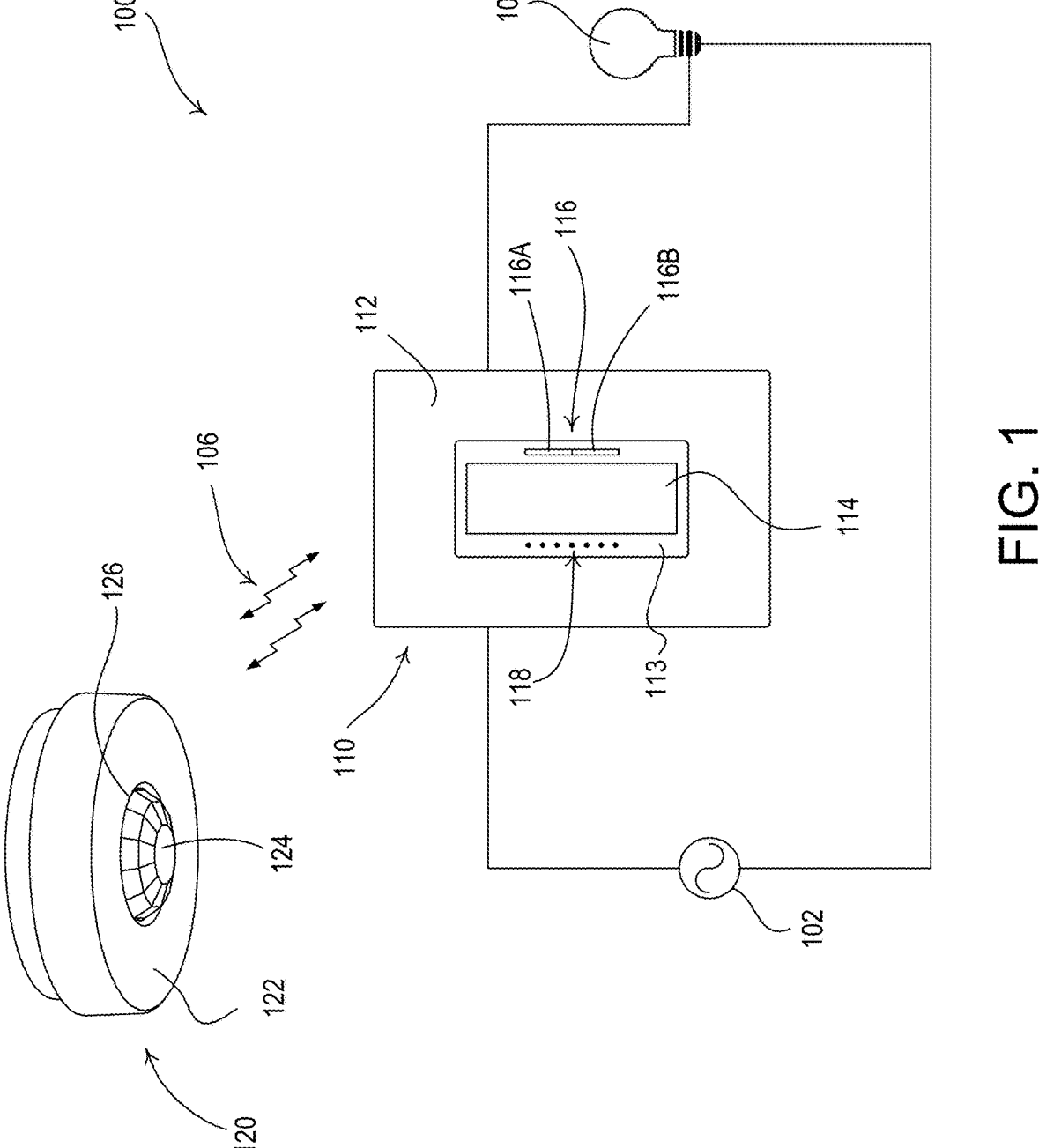
FIG. 1 is a diagram of an example load control system having a sensor device with ultrasonic transmitting and receiving elements.

FIG. 1 is a diagram of an example load control system 100 having a load control device 110 (e.g., a dimmer switch and/or an electronic switch) and a sensor device 120. The load control device 110 may be coupled in series electrical connection between a power source, such as an alternating-current (AC) power source 102, and an electrical load, such as a lighting load 104, for controlling the amount of power delivered to the lighting load 104 and thus an intensity level of the lighting load 104. For example, the load control device 110 may be adapted to be mounted in an electrical wallbox, plugged into an electrical receptacle, and/or mounted remotely (e.g., to a junction box above a ceiling and/or inside a wall). The load control device 110 may comprise a faceplate 112 and a bezel 113 received in an opening of the faceplate. The load control device 110 may further comprise a toggle actuator 114 (e.g., a button) and an intensity adjustment actuator 116. Successive actuations of the toggle actuator 114 toggle, e.g., may turn off and on, the lighting load 104. Actuations of an upper portion 116A or a lower portion 116B of the intensity adjustment actuator 116 may respectively increase or decrease the amount of power delivered to the lighting load 104 and thus increase or decrease the intensity level of the lighting load 104 from a minimum intensity (e.g., 1%) to a maximum intensity (e.g., 100%). A plurality of visual indicators 118, e.g., light-emitting diodes (LEDs), may be arranged in a linear array on the left side of the bezel 113. The visual indicators 118 may be illuminated to provide feedback of the intensity level of the lighting load 104.

The sensor device 120 may be mounted to a ceiling or a wall, for example, in the vicinity of (e.g., a space around) the lighting load 104 controlled by the load control device 110, such that the sensor device 120 may be configured to detect an occupancy condition (e.g., the presence of the occupant) and/or a vacancy condition (e.g., the absence of the occupant) in the vicinity of the lighting load. The sensor device 120 may include an occupancy detection circuit, such as a passive infrared (PIR) detection circuit, which may be housed in an enclosure 122. The passive infrared detection circuit may include a pyroelectric detector, which may be configured to receive infrared energy from an occupant in the space via a lens 124 located in an opening 126 in the enclosure 122. The sensor device 120 may be configured to detect occupancy and/or vacancy conditions in the space around the lighting load 104 in response to passive infrared detection circuit. An example of a sensor device having a passive infrared detection circuit is described in greater detail in U.S. Pat. No. 7,940,167, issued May 20, 2011, entitled BATTERY-POWERED OCCUPANCY SENSOR, the entire disclosure of which is hereby incorporated by reference.

The sensor device 120 may be configured to generate one or more control signals in response to detecting occupancy conditions and/or vacancy conditions in the space around the lighting load 104. For example, the sensor device 120 may be configured to generate an analog control signal (e.g., via a contact closure output circuit) that may be in one of two states depending upon the detection of an occupancy condition or a vacancy condition. Additionally or alternatively, the sensor device 120 may be configured to transmit a message (e.g., a digital message) to the load control device 110 wirelessly via wireless signals (e.g., radio-frequency (RF) signals 106) and/or via a wired communication link (not shown) in response to detecting occupancy conditions and/or vacancy conditions in the space around the lighting load 104. The sensor device 120 may be battery-powered, and/or may be connected to an external power source. The load control device 110 may be configured to turn on the lighting load 104 in response to receiving an indication of an occupancy condition from the sensor device 120 and turn off the lighting load 104 in response to receiving an indication of a vacancy condition from the sensor device 120. While the load control device 110 is described as a dimmer switch in the load control system 100 of the FIG. 1, the load control system 100 may comprise other types of load control devices for controlling electrical loads, such as, switching devices (e.g., such as electronic switches, controllable receptacles, and/or controllable circuit breakers), remotely-installed lighting control devices (e.g., such an electronic ballasts and/or light-emitting diode (LED) drivers), motor control devices (e.g., such as fan speed control devices), motorized window treatments, temperature control devices (e.g., such as thermostats and/or controls for a heating, ventilation, and air-conditioning (HVAC) system), and/or controllable appliances. In addition, the sensor device 120 could be a part of other types of control systems, such as a security system, a building maintenance system, a hospitality management system, and/or an occupant monitoring system.

Figure 2:
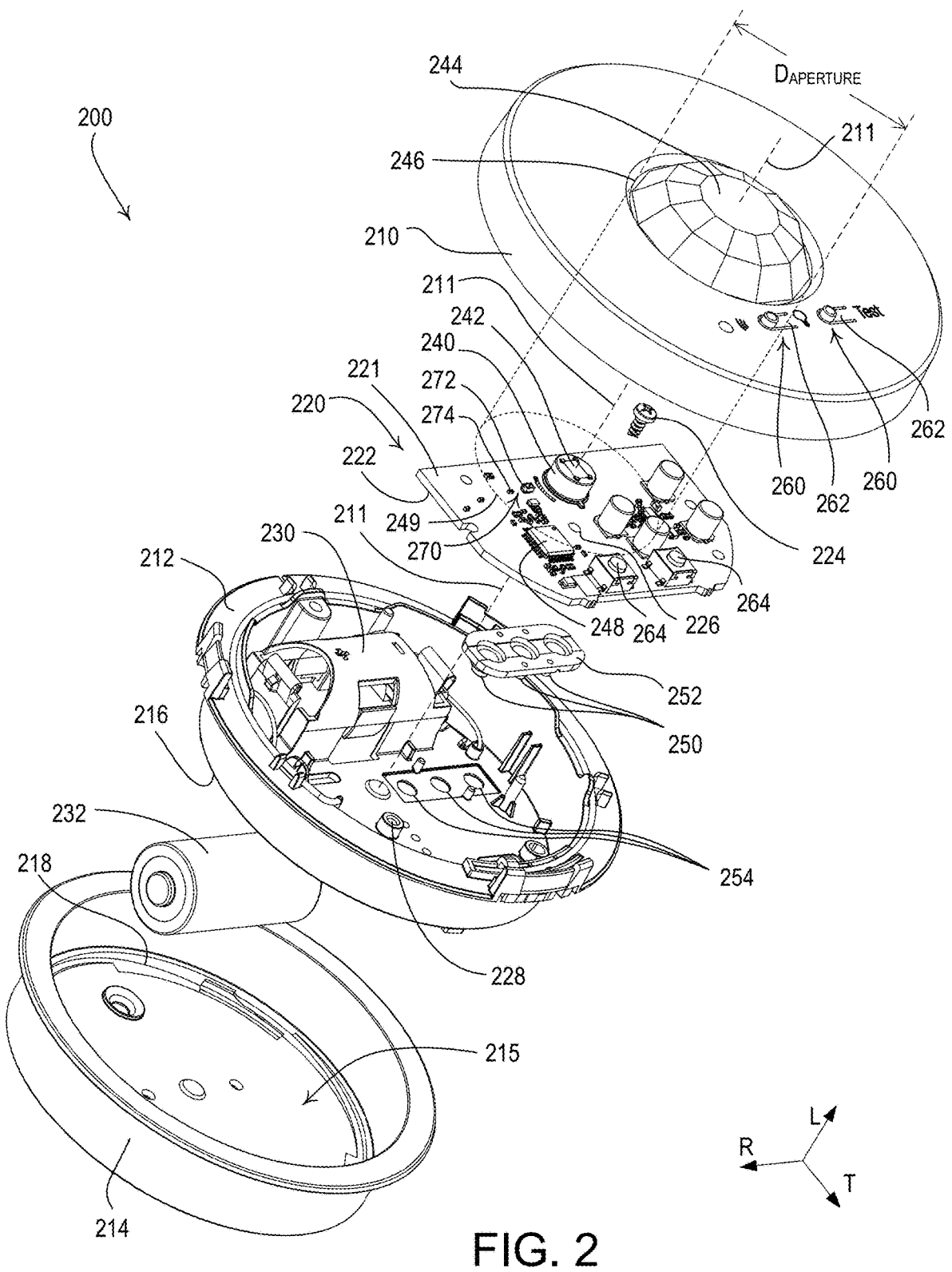
FIG. 2 is an exploded view of an example sensor device that may be deployed as the sensor device in FIG. 1.

FIG. 2 is an exploded view of an example of a sensor device 200, which may be deployed as the sensor device 120 of the load control system 100 shown in FIG. 1. The sensor device 120 may comprise an enclosure having a front portion 210 and a rear portion 212. The front portion 210 of the enclosure may comprise a lens 244 received in an opening 246 in the front portion 210. The lens 244 may be configured to receive infrared energy from an occupant in the space in which the sensor device 200 is located to allow the sensor device to detect occupancy and/or vacancy conditions in the space. The lens 244 and the aperture 246 may be centered around an axis, such as a central axis 211 of the lens 244 (e.g., that extends in a longitudinal direction L). The enclosure (e.g., each of the front portion 210 and the rear portion 212) may have a cylindrical shape that may be centered about an axis, such as, the central axis 211 of the lens 244 (e.g., the central axis 211 of the lens 244 extends through a center of the enclosure). The enclosure (e.g., the rear portion 212 of the enclosure) may be configured to be secured to a base portion 214. For example, the base portion 214 may be mounted to a structure of a building (e.g., a ceiling). The rear portion 212 of the enclosure may be received in a recess 215 of the base portion 214, such that tabs (not shown) extending from a rear surface 216 of the rear portion 212 of the enclosure are received in slots 218 in the base portion 214. The enclosure (e.g., the rear portion 212 of the enclosure) may then be rotated to move the tabs on the rear portion 212 into a position in which the tabs are secured to the base portion 214.

The sensor device 200 may comprise a printed circuit board 220, which may be housed within the enclosure, e.g., between the front portion 210 and the rear portion 212 of the enclosure. The printed circuit board 220 may comprise a front surface 221 and a rear surface 222. For example, electrical circuitry (e.g., electrical components) of the sensor device 200 may be mounted to the front surface 221 and/or the rear surface 222 of the printed circuit board 220. The printed circuit board 220 may be secured to the rear portion 212 of the enclosure via a fastener 224 (e.g., a screw) received through an opening 226 in the printed circuit board 220 and an opening 228 (e.g., a threaded opening) in the rear portion 212 of the enclosure. The rear portion 212 of the enclosure may comprise a battery compartment 230 configured to receive a battery 232 for powering the electrical circuitry of the sensor device 200. For example, the battery 232 may be installed in and removed from the battery compartment 230 when the rear portion 212 of the enclosure is detached from the base portion 214. While the sensor device 200 is shown as a battery-powered device in FIG. 2, the sensor device 200 could also be powered from an alternative wireless power source (e.g., such as, a solar cell and/or an energy-harvesting power source) and/or a wired power source (e.g., such as an external alternating-current (AC) power source and/or a direct-current (DC) power supply).

The sensor device 200 may comprise an occupancy detection circuit, such as a passive infrared (PIR) detection circuit, including a detector 240 (e.g., a pyroelectric detector) mounted to the front surface 221 of the printed circuit board 220. The detector 240 may comprise an opening 242 for receiving infrared energy. The detector 240 may be located on the printed circuit board 220 such that the opening 242 is configured to receive, via a lens 244 located in an aperture 246 in the front portion 210 of the enclosure, infrared energy from an occupant in the space in which the sensor device 200 is located. The aperture 246 of the front portion 210 of the enclosure may have a diameter $D_{APER\text{-}TURE}$ of, for example, approximately 1.4 inches. For example, the detector 240 (e.g., the opening 242 of the detector 240) may be centered about the central axis 211 of the lens 244. The sensor device 200 may also comprise a control circuit 248 mounted to the printed circuit board 220 (e.g., to the front surface 221 and/or the rear surface 222 of the printed circuit board 220. The control circuit 248 may be configured to detect occupancy and/or vacancy conditions in the space in response to the detector 240.

Figure 3:
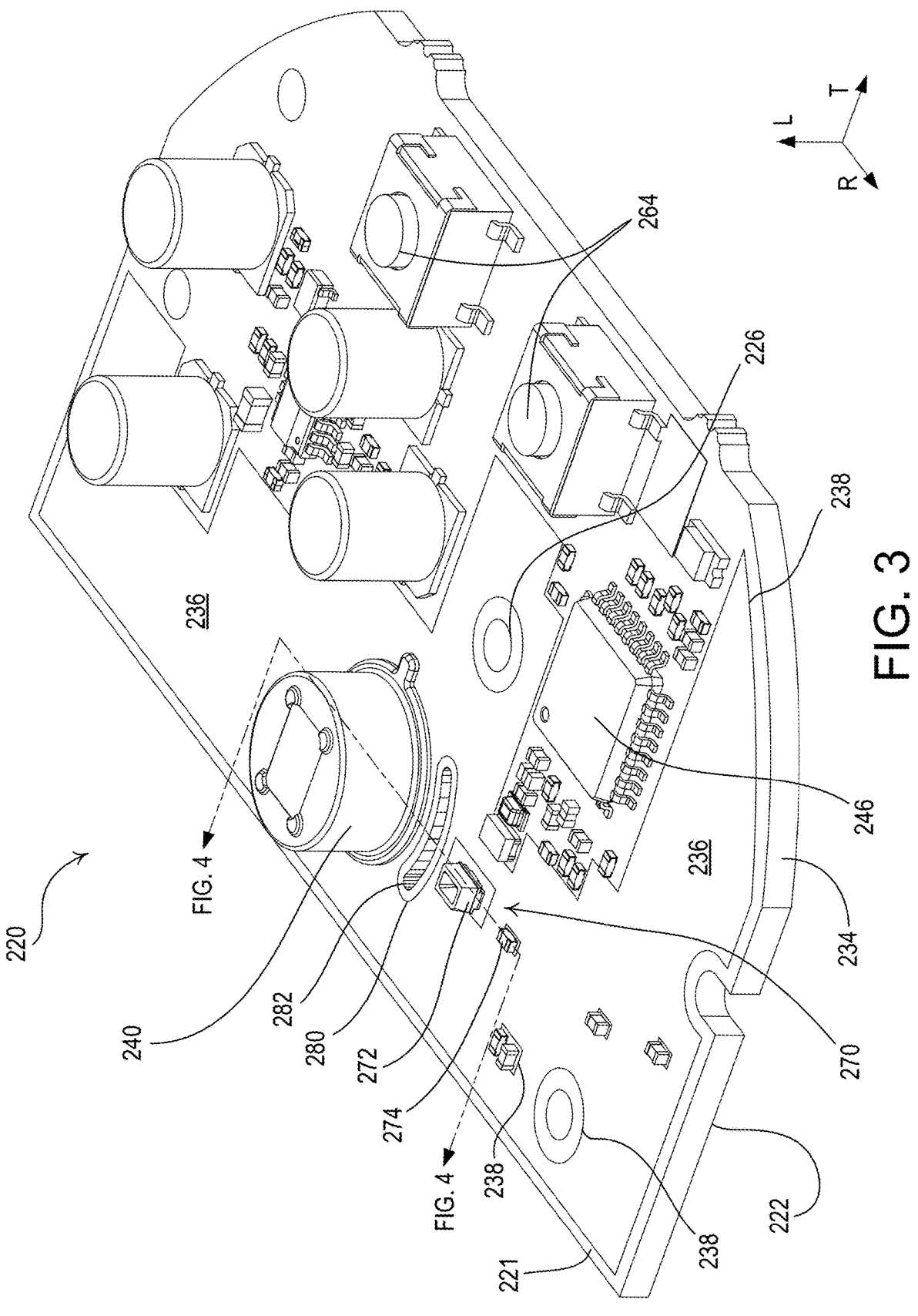
FIG. 3 is a perspective view of an example printed circuit board for use in the sensor device of FIG. 2.

FIG. 3 is an enlarged perspective view of the printed circuit board 220. The printed circuit board 220 may comprise a substrate 234 (e.g., made of FR4 material) to which electrical pads and/or electrical traces affixed. The printed circuit board 220 may comprise a ground plane 236 (e.g., a plate of copper) that may be positioned across the front surface 221 of the printed circuit board 220 (e.g., covering as much free space on the front surface 221 of the printed circuit board 220 as possible). For example, the ground plane 236 may be electrically coupled to a circuit common of the sensor device 200. The ground plane 236 may comprise an edge 238, which extends around the perimeter of the ground plane 236. The edge 238 (e.g., the perimeter) of the ground plane 236 may be configured so as not to extend to edges of the printed circuit board 220. The ground plane may be configured to cover a substantial portion of the front surface 221 of the printed surface board 220 (e.g., covering as much free space on the front surface 221 of the printed circuit board 220 as possible so as not to interfere with electrical connections of components). In some instances, the edge 238 of the ground plane 236 may surround some of the electrical components mounted to the front side 221 of the printed circuit board 220, such that the ground plane 236 does not contact those electrical components. While not shown in FIGS. 2 and 3, the printed circuit board 220 may comprise a second ground plane (e.g., a plate of copper) that may be positioned across the rear surface 222 or a portion thereof of the printed circuit board 220 (e.g., covering as much free space on the printed circuit board 220 as possible so as not to interfere with electrical connections of components). For example, the printed circuit board 220 may comprise a four-layer printed circuit board with a majority of the electrical traces located on inner layers, and the ground plane 236 of the front surface 221 and the ground plane of the rear surface 222 thereby configured to occupy large portions of outer layers (e.g., the outer surfaces) than if the electrical traces were located on the outer layers.

The detector 240 may be susceptible to high-frequency signals (e.g., noise) generated in and/or around the sensor device 200 (e.g., radio-frequency communication signals). For example, high-frequency signals that may be coupled to the detector 240 and/or the electrical traces and electrical components of the passive infrared detection circuit may cause the control circuit 248 to detect an occupancy condition when the space is vacant. The ground plane 236 of the front surface 221 and the ground plane (if present) of the rear surface 222 of the printed circuit board 220 may operate to shield the electrical traces located on inner layers of the printed circuit board 220 from high-frequency signals generated in and/or around the sensor device 200.

Referring back to FIG. 2, the sensor device 200 may comprise one or more programming buttons that may be provided in the rear surface 216 of the rear portion 212 of the enclosure. For example, the programming buttons may be formed by actuation members 250 (e.g., protruding sections) of a rubber membrane 252 with the actuation member 250 received in respective openings 254 of the rear surface 216 of the rear portion 212 of the enclosure. The programming buttons may be accessed when the rear portion 212 of the enclosure is detached from the base portion 214. When one of the actuation members 250 is pressed in towards the rear surface 216 of the rear portion 212, the rubber membrane 252 may flex allowing the respective actuation member 250 to actuate (e.g., short out) a respective switch element on the rear surface 222 of the printed circuit board 220. The control circuit 248 may be configured to be responsive to actuations of the programming buttons, for example, to adjust one or more operational settings (e.g., an occupancy/vacancy mode, a sensitivity level, and/or an occupancy timeout period) of the sensor device 200.

In addition, the sensor device 200 may comprise one or more test buttons 260 in the front portion 210 of the enclosure. For example, the test buttons 260 may be formed as part of the front portion 210 of the enclosure. Each of the test buttons 260 may comprise an arm 262 that may flex when the respective test button 260 is pressed in towards the printed circuit board 220 to allow the test button 260 to actuate a respective mechanical tactile switch 264 mounted to the front surface 221 of the printed circuit board 220. The control circuit 248 may be configured to be responsive to actuations of the test buttons 260. For example, the control circuit 248 may be configured to transmit (e.g., wirelessly transmit) one or more messages including commands for controlling an electrical load in response to an actuation of a first one of the test buttons 260 (e.g., to test the quality of wireless communications of the sensor device 200).

In addition, the control circuit 248 may be configured to initiate a sensor test mode in response to an actuation of a second one of the test buttons 260. The sensor test mode may be used to determine if the sensor device 200 is operating properly during a configuration procedure of the sensor device 200. During the sensor test mode, the sensor device 200 may be configured to illuminate the lens 244 to indicate when an occupancy condition has been detected and not illuminate the lens 244 to indicate when a vacancy condition has been detected. In addition, an occupancy timeout period of the sensor device 200 may be reduced during the sensor test mode to more quickly show when occupancy and/or vacancy conditions have been detected. For example, the sensor device 200 may comprise an indicator circuit 270 including a light source, such as a light-emitting diode (LED) 272 mounted to the front side 221 of the printed circuit board 220. The indicator circuit 270 may also comprise a resistor 274 that may be electrically coupled in series with the LED 272. The indicator circuit 270 (e.g., the series combination of the LED 272 and the resistor 274) may be coupled in series between a supply voltage (not shown) of the sensor device 200 and circuit common, such that the resistor 274 is configured to conduct a drive current for illuminating the LED 272. The control circuit 248 may be configured to control the LED 272 to controllably illuminate the lens 244 during the sensor test mode.

The LED 272 may be mounted to the printed circuit board 220 at a location from which the LED 272 may be configured to produce visible light that shines through the aperture 246 of the front portion 210 of the enclosure and illuminates the lens 244. For example, the LED 272 may be mounted behind (e.g., immediately behind) the lens 244, such that the light emitted by the LED 272 causes a diffuse illumination of the lens 244. This may cause the entire lens 244 to be illuminated, which may allow the illumination of the lens 244 to be more easily viewed during the sensor test mode. As shown in FIG. 2, the LED 272 may be located on the printed circuit board 220 within an area 249 (e.g., a circular area) that is defined by a projected perimeter of the aperture 246 of the front portion 210 of the enclosure onto the printed circuit board 220. For example, the area 249 may have a diameter $D_{AREA}$ that is equal to the diameter $D_{APERTURE}$ of the aperture 246 of the front portion 210 of the enclosure (e.g., approximately 1.4 inches). Since the detector 240 is aligned with the central axis 211 of the lens 244, the detector 240 may also be located on the printed circuit board 220 within the defined area 249. As a result, the detector 240 and the indicator circuit 270 (e.g., the LED 272 and the resistor 274) may be located within close proximity to each other on the printed circuit board 220.

Figure 4:
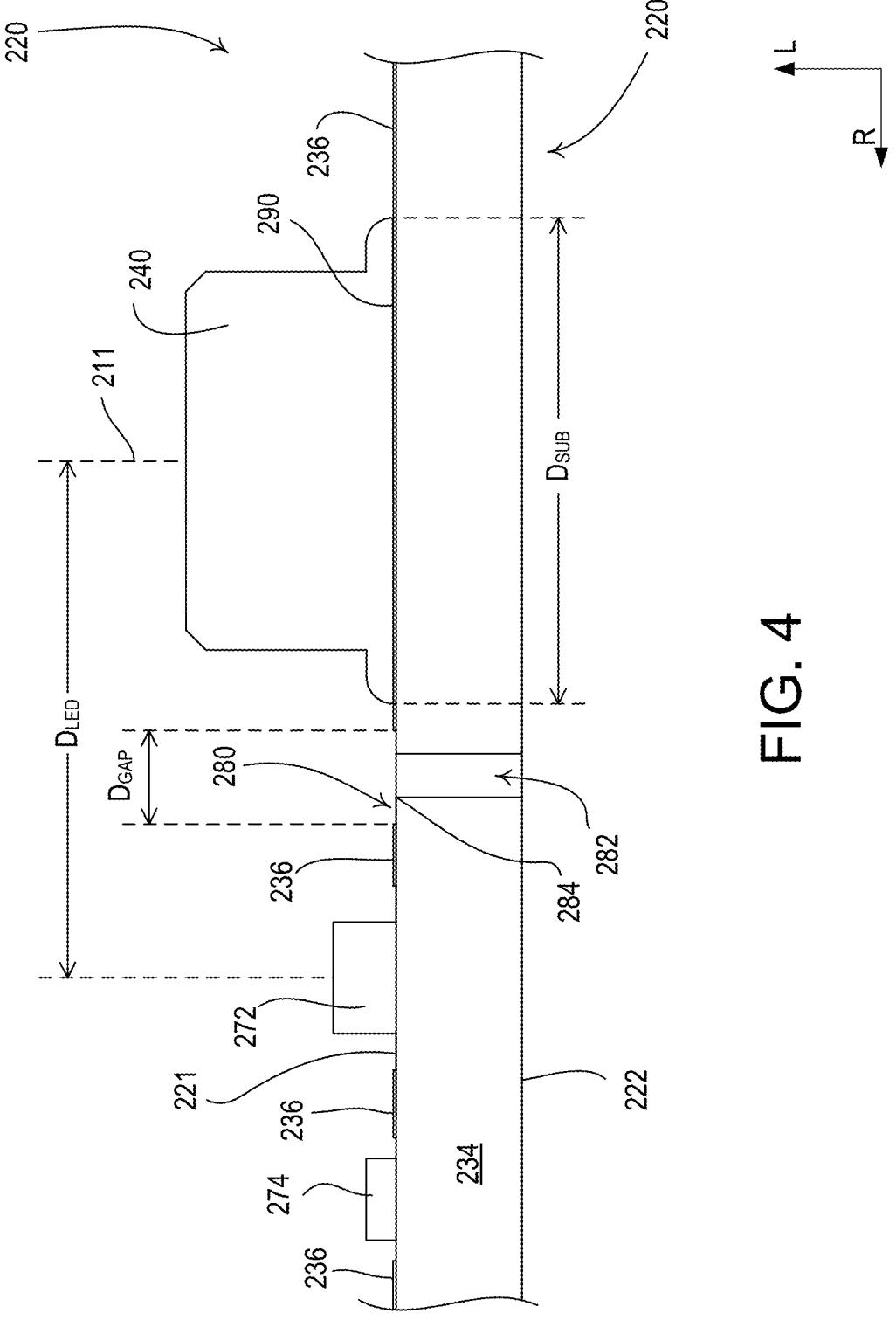
FIG. 4 is an enlarged partial cross-section view of the printed circuit board of FIG. 3 taken through the line shown in FIG. 3.
Figure 5A:
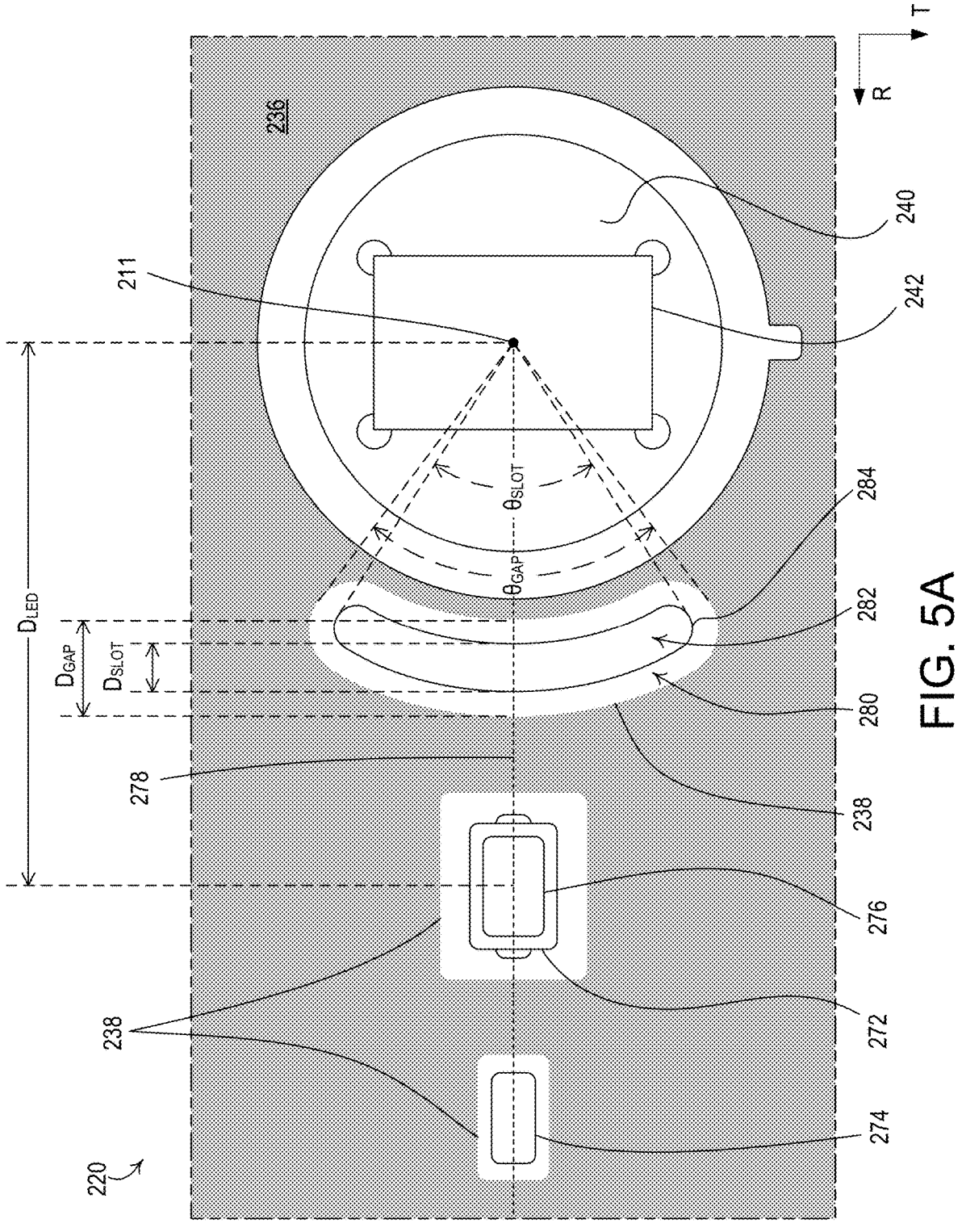
FIG. 5A is an enlarged partial front view of the printed circuit board of FIG. 3 (e.g., showing the portion of the printed circuit board that is shown in FIG. 4).

FIG. 4 is an enlarged partial side cross-section view of the printed circuit board 220 taken through the center of the detector 240 and the LED 272 (e.g., through the line shown in FIG. 3). FIG. 5A is an enlarged partial front view of the printed circuit board 220 (e.g., showing the portion of the printed circuit board 220 that is shown in FIG. 4). The ground plane 236 may be represented by gray shading in FIG. 5A. The LED 272 may comprise a semiconductor die 276 that may be configured to emit light when the LED 272 conducts the drive current. The edge 238 of the ground plane 236 may surround of the LED 272 and the resistor 274. The LED 272 may be arranged along a radial axis 278 (e.g., or substantially along a radial axis) of the sensor device 200 that passes through the central axis 211 of the lens 244 (e.g., the center of the opening 242 of the detector 240). The radial axis 278 may extend in the radial direction R as shown in FIG. 5A. The LED 272 (e.g., the center of the semiconductor die 276 of the LED 272) may be spaced apart from the central axis 221 (e.g., the center or approximate center of the opening 242 of the detector 240) along the radial axis 278 by a distance $D_{LED}$ (e.g., approximately 0.4 inches), which may be less than a radius of the area 249 (e.g., half of the diameter $D_{APERTURE}$ of the aperture 246 of the front portion 210 of the enclosure, e.g., 0.7 inches). In addition, the resistor 274 may be arranged along the radial axis 278 of the sensor device 200 that passes through the central axis 211 of the lens 244 (e.g., the center or approximate center of the opening 242 of the detector 240). The resistor 274 may also be spaced apart from the central axis 221 along the radial axis 278 (e.g., farther away from the detector 240 than the LED 272). While the LED 272 and the resistor 274 are shown aligned along the radial axis 278 that extends in the radial direction R, the LED 272 and the resistor 274 may alternatively be aligned along an axis that extends in another direction from the central axis 211 of the lens 244 (e.g., in a transverse direction T and/or in a direction that includes components of the radial direction R and the transverse direction T). In some examples, the resistor 274 may not be aligned along the same axis with the LED 272.

The indicator circuit 270 (e.g., the LED 272 and the resistor 274) may be a heat-generating circuit. For example, when the LED 272 and the resistor 274 are conducting the drive current to cause the semiconductor die 276 of the LED 272 to emit light, the LED 272 as well as the resistor 274 may dissipate power, which may cause the temperatures of the LED 272 and the resistor 274 to increase. The ground plane 236 may occupy at least a portion of the space between the detector 240 and the indicator circuit 270, and may conduct heat from the indicator circuit 274 towards the detector 240. Since the detector 240 is located within close proximity to the indicator circuit 270 and the ground plane 236 occupies at least a portion of the space between the detector 240 and the indicator circuit 274, an amount of the heat generated by the LED 272 and/or the resistor 274 may be thermally transferred to the detector 240. The operation of the detector 240 may be dependent upon the temperature of the detector 240, such that transient changes in the temperature of the detector 240 may cause changes in the magnitude of the output voltage generated by the detector 240, which may in turn be detected as indications of occupancy conditions by the control circuit 248 (e.g., even when the room is vacant in some cases). For example, transient changes in the temperature of the detector 240 may occur when the control circuit is turning the LED 272 on and off in the sensor test mode to indicate detected occupancy conditions and vacancy conditions, respectively.

To reduce the amount heat that may be thermally transferred from the indicator circuit 270 (e.g., the LED 272 and/or the resistor 274) to the detector 240, the ground plane 236 may define and thereby include a gap 280 in a portion of the ground plane 236 that extends between the indicator circuit 270 and the detector 240. As shown in FIG. 5A, a periphery of the gap 280 in the ground plane 236 may be defined by the edge 238 of the ground plane 236. The radial axis 278 may bisect or approximately bisect the gap 280 (e.g., into two portions of equal size and/or area). For example, the gap 280 may have a width $D_{GAP}$ of approximately 0.07 inches along the radial axis 278. The gap 280 may be, for example, semi-circular in shape along its length (e.g., to partially surround the periphery of the detector 240). For example, the gap 280 may extend for approximately an angular distance $\theta_{GAP}$ that is at least approximately one-fifth of the circumference of the periphery of the detector 240. While the gap 280 is shown in a semi-circular shape, the gap 280 may comprise other shapes, such as a straight shape and/or a curve of piecewise linear segments.

To further reduce the amount heat that may be thermally transferred from the indicator circuit 270 (e.g., the LED 272 and/or the resistor 274) to the detector 240, the printed circuit board 240 may define and thereby include a slot 282 that extends through the printed circuit board 220 (e.g., between the front side 221 and the rear side 222 of the printed circuit board 220). The slot 282 may comprise an opening 284 at the front side 221 of the printed circuit board 220 that is surrounded by the gap 280 in the ground plane 236 (e.g., surrounded by the edge 238 of the ground plane 236 that defines the gap 280). The radial axis 278 may bisect or approximately bisect the slot 282 (e.g., into two portions of equal size and/or area). For example, the slot 282 may have a width $D_{SLOT}$ of approximately 0.3 inches along the radial axis 278. The slot 282 (e.g., the opening 284 of the slot 282) may be semi-circular in shape along its length (e.g., similar to, but smaller in total cross-sectional area than, the gap 280 in the ground plane 236). For example, an area of the opening 284 of the slot 282 (e.g., a cross-sectional area of the slot 282) may be smaller than an area of the gap 280 in the ground plane 236 (e.g., a cross-sectional area of the ground plane 236 as can be seen in FIG. 5A). The slot 282 (e.g., the opening 284 of the slot 282) may extend for an angular distance $\theta_{SLOT}$ that is, for example, at least approximately one-fifth of the circumference of the periphery of the detector 240. While the slot 280 is shown extending entirely through the printed circuit board 220 (e.g., from the front surface 221 to the rear surface 222) in FIG. 4, the slot 280 may extend partially through the printed circuit board 220, for example, from the front surface 221 for a length into the printed circuit board 220 that does not extend to the rear surface 222.

Figure 5B:
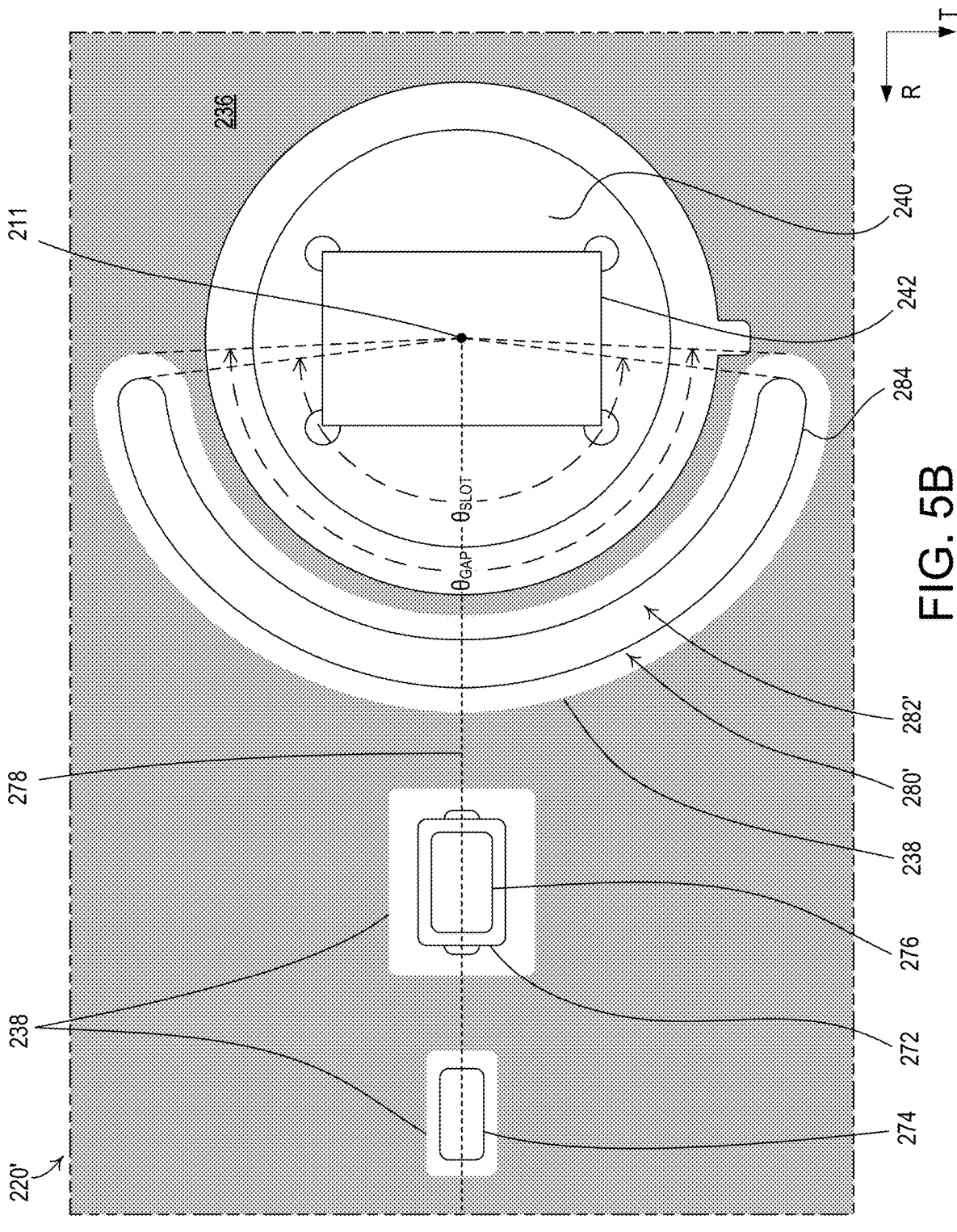
FIG. 5B is an enlarged partial front view of another example printed circuit board for use in the sensor device of FIG. 2.

In some examples, the gap 280 and the slot 282 may extend for greater angular distances around the circumference of the periphery of the detector 240. FIG. 5B is an enlarged partial front view of an example of another printed circuit board 220' that may be used in the sensor device 200 (e.g., showing a similar portion of the printed circuit board 220' as the portion of the printed circuit board 220 shown in FIG. 5A). The printed circuit board 220' may comprise a gap 280' that may extend for an angular distance θGAP that is almost one-half of the circumference of the periphery of the detector 240. The printed circuit board 220' may comprise a slot 282' that may extend for an angular distance $\theta_{SLOT}$ that is almost one-half of the circumference of the periphery of the detector 240.

Figure 6:
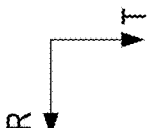
FIG. 6 is a partial front view of the printed circuit board of FIG. 3 illustrating a heat transient (e.g., the result of a simulation of a heat transient) on the printed circuit board around an indicator circuit of the sensor device.
Figure 6:
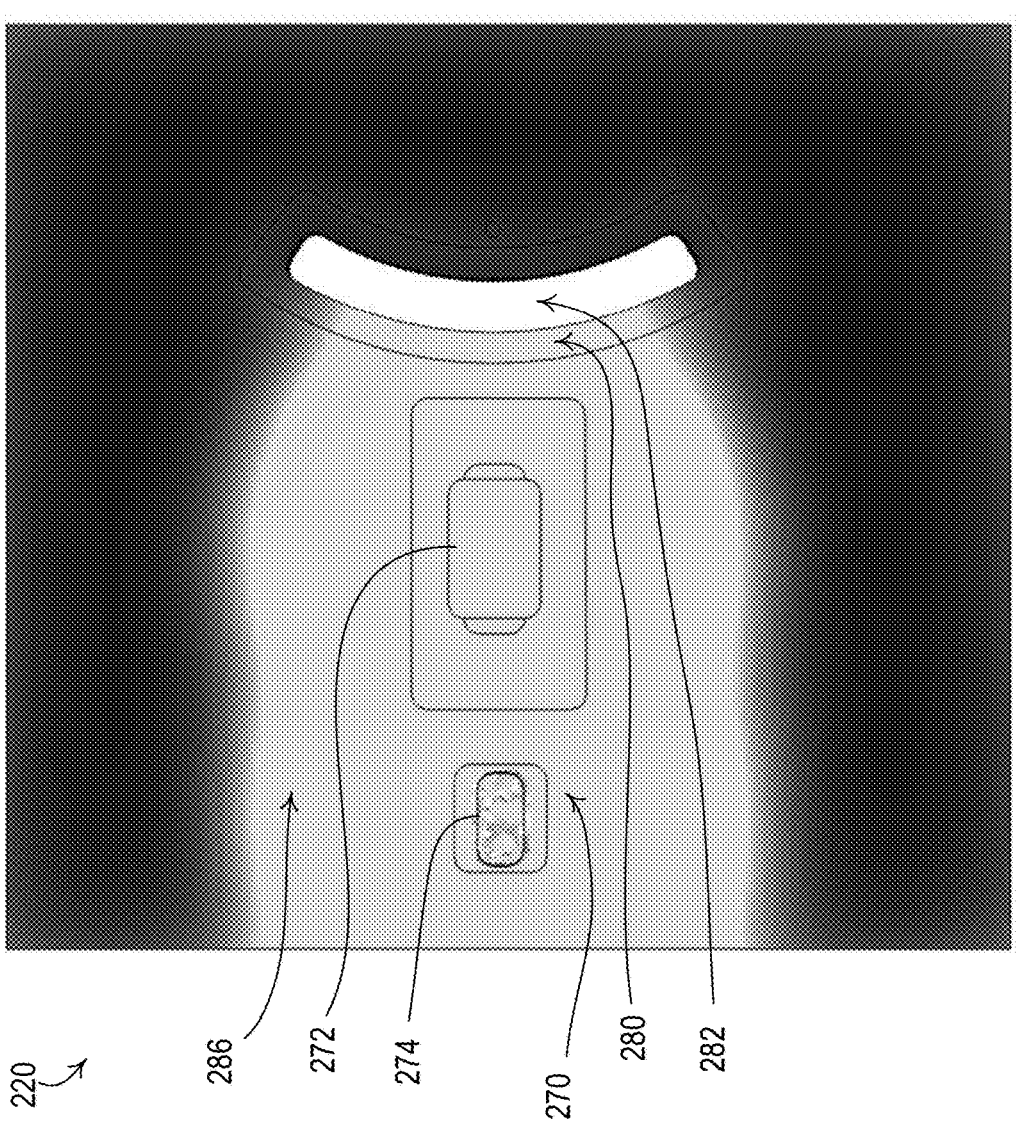

FIG. 6 is a partial front view of the printed circuit board 220 (e.g., of FIGS. 2-5A) illustrating a heat transient (e.g., the result of a simulation of a heat transient) on the printed circuit board 220 around the indicator circuit 270 (e.g., the LED 272 and the resistor 274) and the slot 282. The portion of the printed circuit board 220 illustrated in gray (e.g., a hot area 286) may represent an area of relatively high temperature and the portion of the printed circuit board 220 illustrated in black may represent an area of relatively low temperature (e.g., lower temperature as compared to the hot area 286). As shown in FIG. 6, the slot 282 may prevent the heat (e.g., the high temperatures in the hot area 286) from being thermally conducted past the slot, and thus being thermally conducted to the detector 240. The gap 280 in the ground plane 236 and/or the slot 282 in the printed circuit board 220 may operate to thermally insulate the detector 240 from the heat generated by the indicator circuit 270 (e.g., the LED 272 and the resistor 274).

Figure 7:
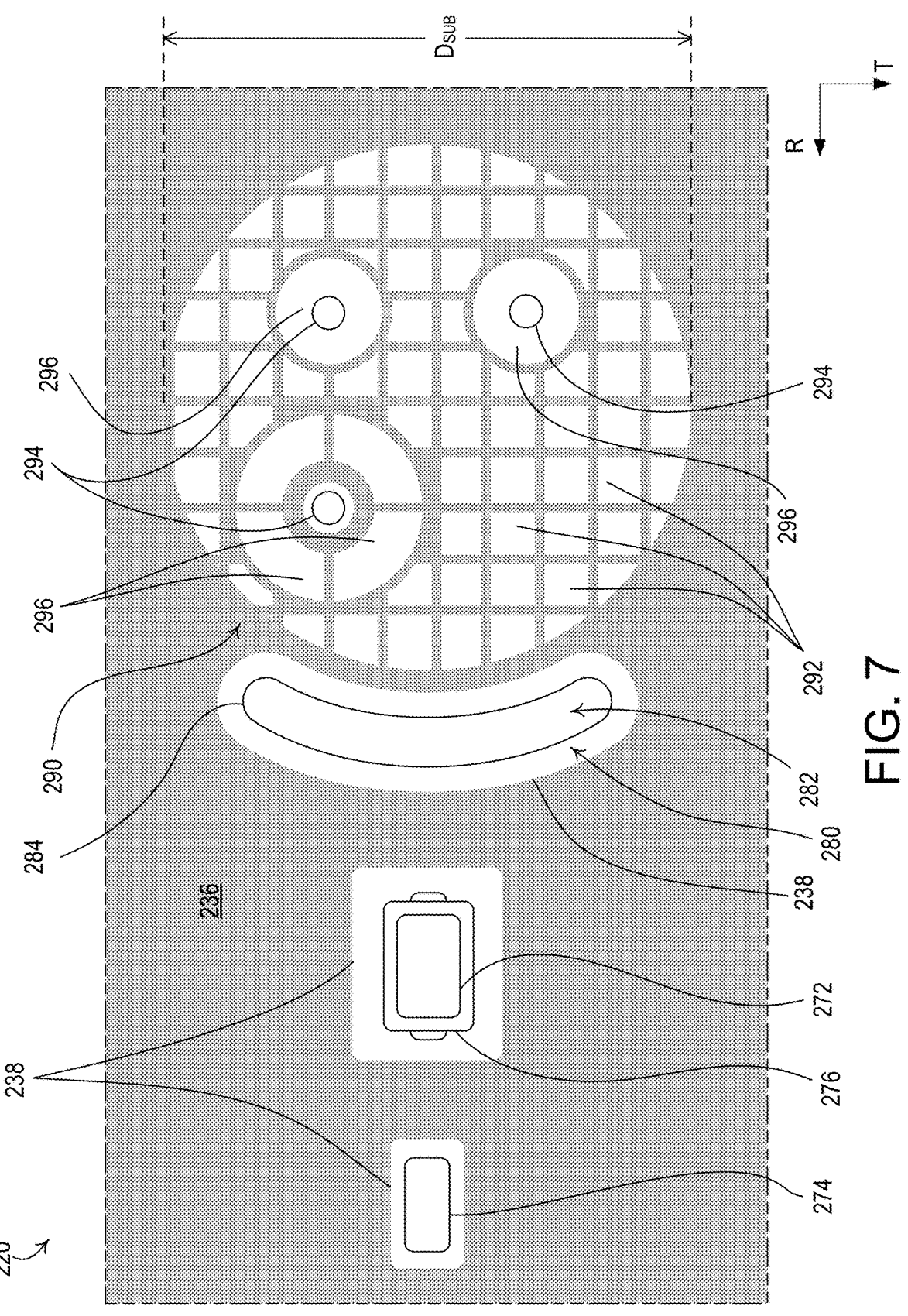
FIG. 7 is an enlarged partial front view of the printed circuit board of FIG. 3 with a detector removed (e.g., showing the portion of the printed circuit board that is shown in FIG. 4).

As shown in FIG. 4, the ground plane 236 may extend below the detector 240, for example, to provide additional shielding from high-frequency signals. An alternative example is shown in FIG. 7, which is an enlarged partial front view of the printed circuit board 220 (e.g., showing the portion of the printed circuit board 220 that is shown in FIG. 5A) with the detector 240 removed from the printed circuit board 220. The ground plane 236 may be represented by gray shading in FIG. 7. The ground plane 236 may comprise a sub-detector portion 290 (e.g., a circular portion) that is located below the detector 240 (e.g., when the detector 240 is mounted to the printed circuit board 220). For example, the sub-detector portion 290 of the ground plane 236 may have a diameter $D_{SUB}$ that is approximately equal to a diameter of the detector 240. The sub-detector portion 290 of the ground plane 236 may define a mesh pattern (e.g., a grid pattern) of copper, for example. The sub-detector portion 290 (e.g., the mesh pattern) of the ground plane 236 may define voids 292 (e.g., square-shaped voids although other shapes may be used) between the sections of the ground place 236. As shown in FIG. 7, the voids 292 may be arranged in an array (e.g., in linear columns and rows). The detector 240 may comprise leads (not shown) that may be extend through (e.g., and be electrically connected to) through-holes 294 (e.g., plated through-holes) in the printed circuit board 220. The sub-detector portion 290 may also define voids 296 (e.g., circularly-shaped voids) surrounding the through-holes 294. The voids 292, 296 may represent areas of the sub-detector portion 290 through which the surface of the substrate 234 is exposed to a bottom side of the detector 240. In some examples, the sub-detector portion 290 (e.g., the copper) of the ground plane 236 may not be laid out in a mesh pattern, but may, for example, be laid out such that the voids 292 are arranged in a non-periodic pattern, an irregular pattern, and/or a periodic pattern with voids of alternate shapes. In other examples, the sub-detector portion 290 of the ground plane 236 may be solid except for the voids 296 for the through-holes 294. In some examples, the ground plane 236 may not extend below the detector 240 (e.g., the edge 238 of the ground plane 236 may surround the detector 240 and the bottom of the detector 240 may be exposed to only the surface of the substrate 234 of the printed circuit board 220.

The sub-detector portion 290 of the ground plane 236 (e.g., the mesh pattern of copper) may operate to shield the detector 240 from high-frequency signals, while further decreasing the amount of heat that may be thermally conducted to the detector 240 from the indicator circuit 270 (e.g., due to the voids 292, 296 in the ground plane 236). The characteristics of the mesh pattern of the sub-detector portion 290 (e.g., the pitch of the mesh, the widths of the parallel and perpendicular strands of copper in the mesh, and/or the area of the voids 292, 294 in the mesh) may be sized to shield (e.g., block) high-frequency signals above a cut-off frequency (e.g., limit and/or prevent high-frequency signal from being transmitted through the sub-detector portion 290). For example, the cut-off frequency may be below the frequency at which the detector 240 may be susceptible to noise and may cause the control circuit 248 to detect occupancy conditions when the space is vacant. The voids 292, 294 in the sub-detector portion 290 of the ground plane 236 may cause less heat to be thermally conducted from the indicator circuit 270 to the detector 240 than if the voids 292, 294 were not included.

Figure 8:
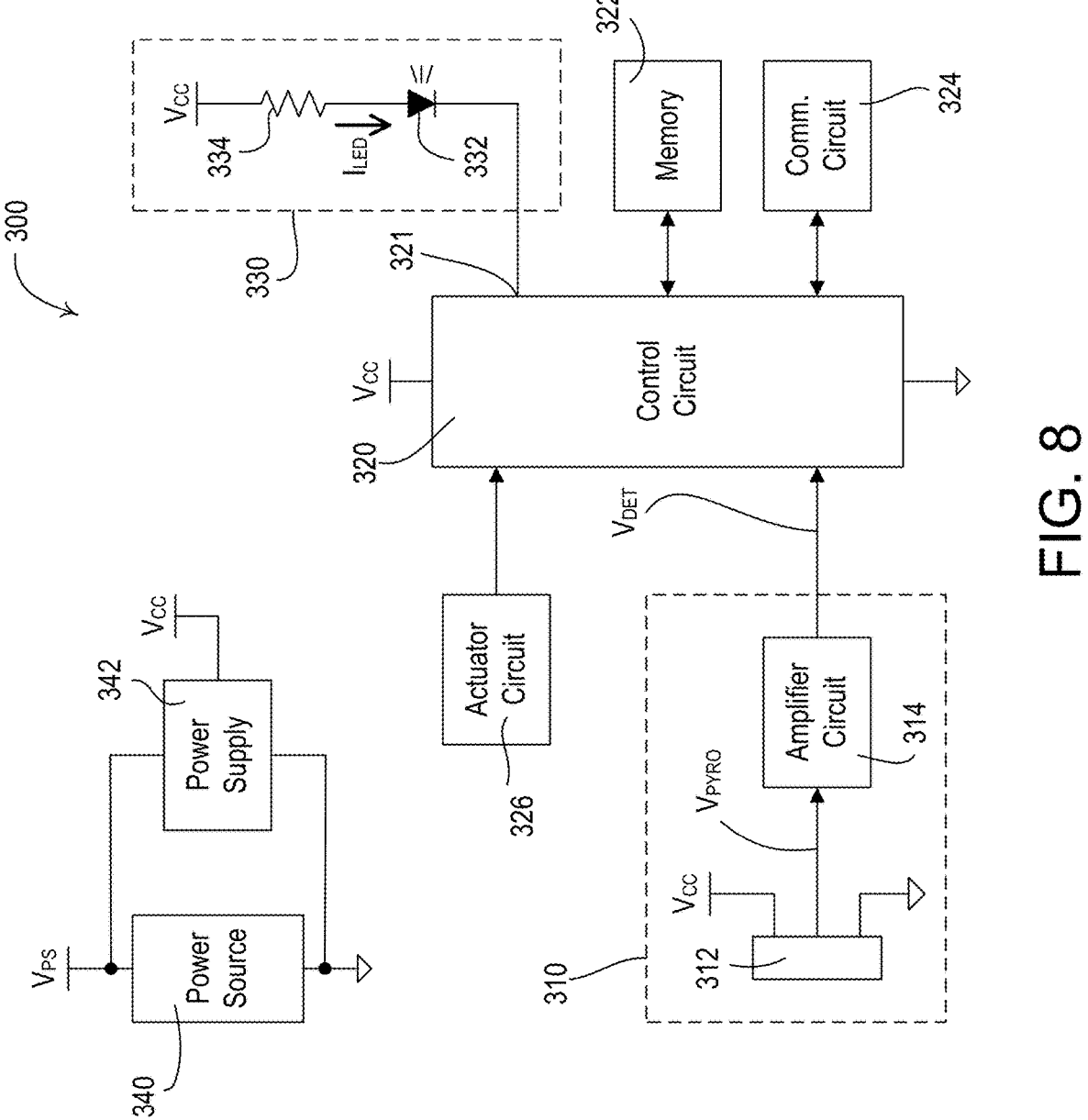
FIG. 8 is a block diagram of an example sensor device.

FIG. 8 is a block diagram of an example sensor device 300, which may be deployed as the sensor device 120 of the lighting control system 100 shown in FIG. 1 and/or the sensor device 200 shown in FIG. 2. The sensor device 300 may comprise an occupancy detection circuit, such as a passive infrared (PIR) detection circuit 310. The PIR detection circuit 310 may comprise a detector, such as a pyroelectric detector 312, configured to receive infrared energy from an occupant in the space via a lens of the sensor device 300 (e.g., the lens 244). The pyroelectric detector 312 may be configured to generate an output signal $V_{PYRO}$ in response to the received infrared energy. The PIR detection circuit 310 may comprise an amplifier circuit 314 configured to amplify the output signal $V_{PYRO}$ of the pyroelectric detector 312 to generate an amplified signal. The PIR detection circuit 310 may be configured to generate a detection signal VDET that indicates an occupancy condition in response to the amplified signal (e.g., in response to the output signal $V_{PYRO}$ of the pyroelectric detector 312). In some examples, the detection signal VDET may be the amplified signal. For example, the amplifier circuit 314 may comprise one or more amplifier circuit stages (e.g., one or more internal amplifier circuits). The amplifier circuit 314 may be characterized by, for example, a high gain (e.g., greater than approximately 1000, such as approximately 10,000).

The sensor device 300 may comprise a control circuit 320 coupled to the PIR detection circuit 314 for receiving the detection signal VDET to detect an occupancy and/or vacancy condition (e.g., the presence and/or absence of an occupant) in a space in which the sensor device 300 is installed. For example, the control circuit 320 may include one or more of a processor (e.g., a microprocessor), a microcontroller, a programmable logic device (PLD), a field programmable gate array (FPGA), an application specific integrated circuit (ASIC), or any suitable controller or processing device. The sensor device 300 may comprise a memory 322 configured to store operational characteristics (e.g., such as operational settings, control parameters, indications of occupancy and/or vacancy conditions in the space, operating modes of the sensor device, etc.), association information for associations with other devices, and/or instructions for controlling electrical loads. The memory 322 may be implemented as an external integrated circuit (IC) or as an internal circuit of the control circuit 320. The memory 322 may comprise a computer-readable storage media or machine-readable storage media that maintains computer-executable instructions for performing one or more procedure and/or functions as described herein. For example, the memory 322 may comprise computer-executable instructions or machine-readable instructions that when executed by the control circuit configure the control circuit to provide one or more portions of the procedures described herein. The control circuit 322 may access the instructions from memory 322 for being executed to cause the control circuit 320 to operate as described herein, or to operate one or more other devices as described herein. The memory 322 may comprise computer-executable instructions for executing configuration software. For example, the operational characteristics and/or the association information stored in the memory 322 may be configured during a configuration procedure of the sensor device 300.

The sensor device 300 may comprise a power source 340 for producing a power source voltage $V_{PS}$. For example, the power source 340 may comprise one or more batteries (e.g., the battery 232) and/or a photo-voltaic power source (e.g., a solar cell). In addition, the power source 340 may comprise one or more energy storage elements, such as super capacitors and/or rechargeable batteries. Further, the power source 340 may also be configured to receive power from an external power source, such as an external direct-current (DC) power source or an alternating-current (AC) power source. The sensor device 300 may also comprise a power supply 342 that may be configured to receive the power source voltage $V_{PS}$ and generate a DC supply voltage $V_{CC}$ for powering the control circuit 320 and other low-voltage circuitry of the sensor device 300.

The sensor device 300 may comprise a communication circuit 324 that may allow the control circuit 320 to communicate (e.g., transmit and/or receive) communication signals, e.g., wired communication signals and/or wireless communication signals, such as radio-frequency (RF) signals. The communication circuit 324 may comprise, for example, an RF transceiver, an RF receiver, an RF transmitter, an infrared (IR) receiver, and/or other suitable wireless communication circuit. For example, the communication circuit 324 may be coupled to an antenna (not shown) for transmission and/or reception of the RF signals. The sensor device 300 may be configured to communicate messages (e.g., digital messages) with external control devices (e.g., load control devices, such as the load control device 110). For example, the control circuit 320 may be configured to transmit messages to the load control devices via the communication circuit 324 when an occupancy and/or vacancy condition is detected in response to the PIR detection circuit 310. For example, the transmitted messages may include an indication of the detected occupancy and/or vacancy condition. In addition, the control circuit 320 to execute the configuration procedure and/or adjust the operational characteristics and/or settings of the sensor device 300 in response to messages received via the communication circuit 324 (e.g., received from a remote control and/or a mobile device).

The sensor device 300 may comprise an actuator circuit 326. The actuator circuit 326 may include, for example, one or more actuators (e.g., the mechanical tactile switch 264 mounted to the front surface 221 of the printed circuit board 220 and/or the switch elements on the rear surface 222 of the printed circuit board 220) that may be actuated by buttons (e.g., the test buttons 260 and/or the programming buttons) for receiving user inputs. The control circuit 320 may be configured to adjust one or more operational settings (e.g., an occupancy/vacancy mode, a sensitivity level, and/or an occupancy timeout period) of the sensor device 300 in response to actuations of the actuators of the actuator circuit 326. The control circuit 320 may be configured to transmit (e.g., wirelessly transmit) one or more messages including commands for controlling an electrical load in response to actuations of the actuators of the actuator circuit 326.

The sensor device 300 may comprise an indicator circuit 330 (e.g., the indicator circuit 270) that includes a light source, such as a light-emitting diode (LED) 332. The LED 332 may be coupled in series with a resistor 334 and to the control circuit 320 (e.g., to a port 321 of the control circuit). For example, the LED 332 may be configured to illuminate the lens of the sensor device 300. The series combination of the LED 332 and the resistor 334 may be coupled between the supply voltage $V_{CC}$ and circuit common through the control circuit 320. The control circuit 320 may be configured to pull the port 321 that is coupled to the LED 332 low (e.g., to circuit common) to cause the resistor 344 to conduct a drive current IDR and thus cause the LED 332 to emit light. The control circuit 320 may be configured to control the indicator circuit 330 to cause the LED 322 to be illuminated at a constant level and/or to cause the LED 322 to blink. The control circuit 320 may be configured to control the indicator circuit 330 to cause the LED 332 to illuminate the lens in response to actuations of the actuators of the actuator circuit 326 and/or in response to messages received via the communication circuit 324. During normal operation, the control circuit 320 may be configured to control the indicator circuit 330 to cause the LED 332 to illuminate the lens to indicate when an occupancy condition has been detected and not illuminate the lens to indicate when a vacancy condition has been detected. In addition, the control circuit 320 may be configured to control the indicator circuit 330 to illuminate the LED 322 during a sensor test mode (e.g., to cause the LED 332 to illuminate the lens to indicate when an occupancy condition has been detected and not illuminate the lens to indicate when a vacancy condition has been detected). The control circuit 320 may be configured to initiate the sensor test mode in response to actuations of actuators of the actuator circuit 326.

What is claimed is:

1. A sensor device configured to detect an occupancy condition in a space, the sensor device comprising:

an enclosure having an aperture in which a lens is received, the lens centered about a first axis that extends in a longitudinal direction;

a printed circuit board housed within the enclosure, the printed circuit board having a front surface and a rear surface, the printed circuit board including a ground plane that covers at least a portion of the front surface;

a passive infrared sensing circuit including a detector having an opening for receiving infrared energy, the detector mounted to the front surface of the printed circuit board, such that the opening of the detector is substantially centered about the first axis of the lens, the detector configured to receive infrared energy through the lens and generate an output signal in response to the received infrared energy, the passive infrared sensing circuit configured to generate an occupant detection signal based on the output signal generated by the detector;

a light-emitting diode at a location such that when illuminated, light from the light-emitting diode illuminates the lens, wherein the location of the light-emitting diode is such that the light-emitting diode is mounted to the front surface of the printed circuit board and spaced apart from the detector along a second axis that extends in a radial direction and passes through the first axis of the lens, wherein at least a portion of the ground plane is located along the second axis between the detector and the light-emitting diode; and a control circuit configured to receive the occupant detection signal and to determine the occupancy condition in the space in response to the occupant detection signal, the control circuit further configured to control the light-emitting diode to illuminate the lens;

wherein the ground plane comprises a gap located along the second axis in the portion of the ground plane located between the detector and the light-emitting diode, the gap in the ground plane configured to reduce a thermal transfer of heat generated by the light-emitting diode to the detector.

2. The sensor device of claim 1, wherein the printed circuit board comprises a slot extending from the front surface into the printed circuit board, the slot located between the detector and the light-emitting diode to reduce the thermal transfer of heat generated by the light-emitting diode to the detector.

3. The sensor device of claim 2, wherein the slot extends from the front surface to a rear surface of the printed circuit board.

4. The sensor device of claim 2, wherein the gap in the ground plane surrounds an opening of the slot at the front surface of the printed circuit board.

5. The sensor device of claim 2, wherein an area of an opening of the slot at the front surface of the printed circuit board is smaller than an area of the gap.

6. The sensor device of claim 1, wherein the ground plane extends underneath the detector.

7. The sensor device of claim 6, wherein a portion of the ground plane underneath the detector is laid out in a mesh pattern.

8. The sensor device of claim 7, wherein the mesh pattern of the portion of the ground plan underneath the detector defines voids through which a substrate of the printed circuit board is exposed to a bottom side of the detector.

9. The sensor device of claim 6, wherein a portion of the ground plane underneath the detector defines voids through which a substrate of the printed circuit board is exposed to a bottom side of the detector.

10. The sensor device of claim 1, further comprising:

a resistor coupled in series with the light-emitting diode, the series combination of the light-emitting diode and the resistor coupled in series between a supply voltage and circuit common, such that the light-emitting diode conducts a drive current for illuminating the light-emitting diode.

11. The sensor device of claim 10, wherein the resistor is mounted to the front surface of the printed circuit board and spaced apart from the detector along the second axis.

12. The sensor device of claim 11, wherein the resistor is located farther away from the detector than the light-emitting diode.

13. The sensor device of claim 1, further comprising:

an actuator configured to be actuated by a user;

wherein the control circuit is configured to be responsive to actuations of the actuator.

14. The sensor device of claim 13, wherein the control circuit is configured to enter a test mode in response to an actuation of the actuator, the control circuit configured, during the test mode, to control the light-emitting diode to illuminate the lens in response to detecting an occupancy condition and to not illuminate the lens in response to detecting a vacancy condition.

15. The sensor device of claim 13, wherein the control circuit is configured to control the light-emitting diode to illuminate the lens in response to detecting an actuation of the actuator.

16. The sensor device of claim 1, further comprising:

a communication circuit configured to communicate messages.

17. The sensor device of claim 16, wherein the control circuit is configured to control the light-emitting diode to illuminate the lens in response receiving a message.

18. The sensor device of claim 16, wherein the control circuit is configured to control the communication circuit to transmit a message including an indication of a detected occupancy condition.

19. The sensor device of claim 1, wherein the detector and the light-emitting diode are located within an area on the printed circuit board that is defined by a projected perimeter of the lens onto the printed circuit board.

20. The sensor device of claim 1, wherein the second axis substantially bisects the gap into two portions of equal area.

21. The sensor device of claim 1, wherein the first axis of the lens extends through the center of the enclosure.

22. The sensor device of claim 1, wherein the enclosure has a cylindrical shape that is centered about the first axis of the lens.

* * * * *